United States Patent [19]

Ziolko

[11] 4,153,975

[45] May 15, 1979

[54] METHOD AND APPARATUS FOR PARTING A SEGMENT FROM A LENGTH OF SHIRRED, THIN-WALLED TUBING

[75] Inventor: Francis J. Ziolko, Bridgewater, N.J.

[73] Assignee: Devro, Inc., Somerville, N.J.

[21] Appl. No.: 871,671

[22] Filed: Jan. 23, 1978

[51] Int. Cl.² .............................................. A22C 13/00
[52] U.S. Cl. ........................................ 17/45; 17/1 F; 17/49; 17/42
[58] Field of Search ..................... 17/42, 45; 138/118.1

[56] References Cited

U.S. PATENT DOCUMENTS

| | | | |
|---|---|---|---|
| 3,112,517 | 12/1963 | Ives | 17/42 |
| 3,942,221 | 3/1976 | Sipusic | 17/42 |

*Primary Examiner*—Willie G. Abercrombie
*Attorney, Agent, or Firm*—Richard J. Rodrick

[57] ABSTRACT

A method of parting a segment from an advancing length of shirred, thin-walled tubing. The method comprises unfolding a portion of the shirred tubing intermediate the ends while the same is advancing by applying a separator to the shirred tubing. After the portion is unfolded, the separator is removed, and the tubing is then parted in its unfolded portion to produce a segment of shirred, thin-walled tubing. This invention also involves an apparatus for parting a segment from a length of shirred, thin-walled tubing. The apparatus includes a support for the tubing and a device for advancing the shirred tubing along the support. A separator is engageable with the shirred tubing to unfold a portion. Parting jaws positioned in advance of the separator are engageable with the tubing for severing the same in its unfolded portion to produce a segment of shirred, thin-walled tubing.

21 Claims, 17 Drawing Figures

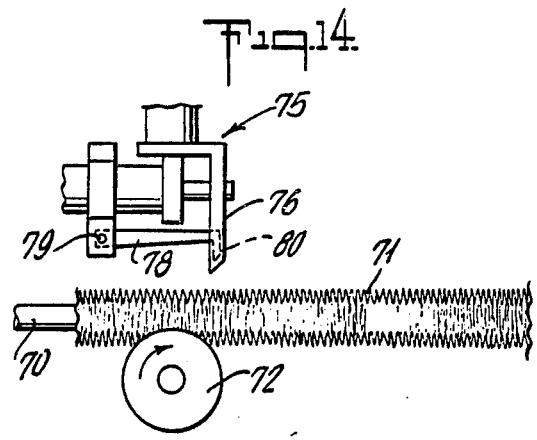
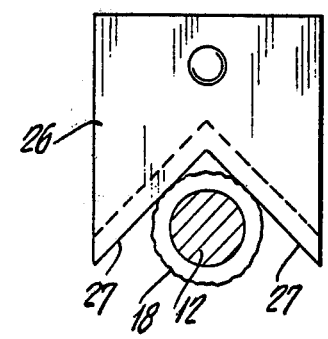
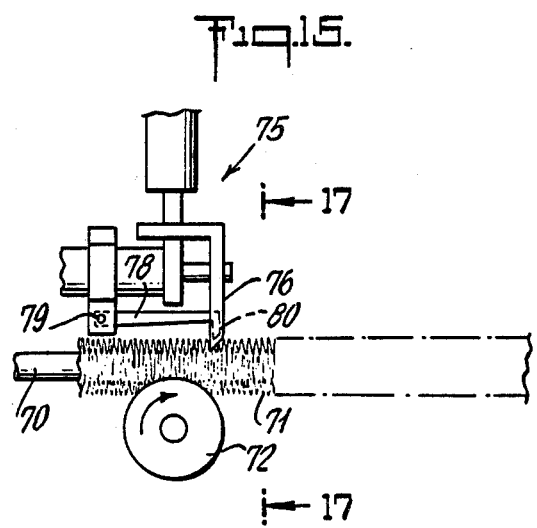
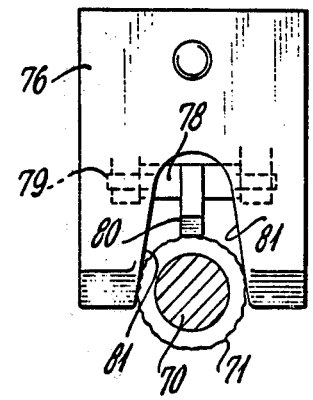
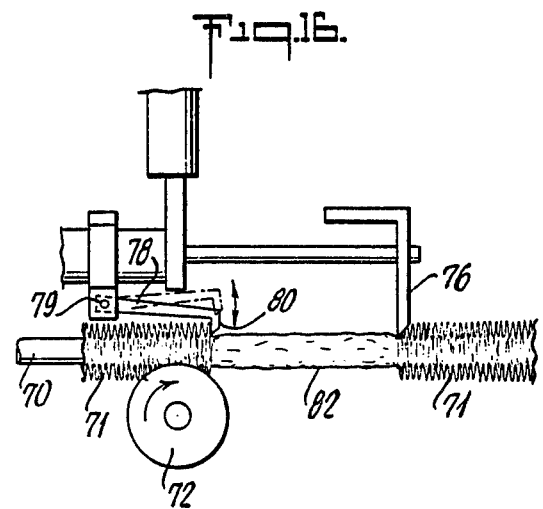

METHOD AND APPARATUS FOR PARTING A SEGMENT FROM A LENGTH OF SHIRRED, THIN-WALLED TUBING

BACKGROUND OF THE INVENTION

This invention relates generally to a method and apparatus for parting thin-walled tubing, and more particularly concerns a method and apparatus for parting a segment from a moving length of shirred, thin-walled tubing.

In the manufacture and production of stuffed sausage products, the casing which holds and surrounds the product within is generally a thin-walled tubing which has a size to suit the product being formed. Particularly, the tubing for sausage and the like casings may vary from product to product, and manufacturer to manufacturer, but may be made of collagen, cellulosic, natural casing, and other commonly known and used materials. For efficiencies and economies of operation, many of these casings are stuffed with an emulsion at high speeds by various and known fitting or stuffing apparatuses. To be compatible with this apparatus capability, the sausage casings need be of sufficient length to handle the rapid injection of stuffing material with a minimal number of casing changes in order to make the operation more efficient.

It can be appreciated that long lengths of sausage casing present production and handling difficulties if attempts are made to stuff the same in the extended condition. Accordingly, the sausage stuffing industry, for instance, has employed a shirred sausage casing, one which is accordion pleated, gathered or folded so that, for example, a 50 foot (15.2 m.) length of tubing is compressed to a length of approximately 9 inches (23 cm.) or less.

Such a shortened sausage casing is easily stored and handled, quickly transferred to the stuffing apparatus during stuffing, and readily extended as the emulsion is forced within the inside of the tubing to unfold the pleats as it fills out the casing. In this sense, a shirred tubing or casing of finite or prescribed length (in the compressed state) is highly desirable for use in conjunction with high speed stuffing equipment.

Many apparatuses are known and available to produce this desirable shirred tubing, for example, the shirring machine as described in U.S. Pat. No. 3,315,300. Typically, a continuous length of thin-walled tubing is formed and provided to the mechanism which folds and pleats the material in the shirred condition. As the provided tubing is often and preferably continuous, provisions to sever the tubing into appropriate lengths for subsequent use on stuffing apparatuses are generally included in or with the apparatus which shirrs the tubing. In some instances, the tubing is severed into segments of appropriate length before or prior to the shirring of the tubing; thus, the severed segment itself is subsequently shirred. In other instances, the continuous length of tubing is shirred as it advances, and is severed into segments subsequent to the shirring step.

In U.S. Pat. No. 3,315,300, as referred to above, a continuous length of tubing is provided to a shirring mechanism, but the severing device is located in the apparatus at a position prior to the shirring mechanism. While the desirable shirred condition and prescribed length of shirred tubing are accomplished, it has been found that this type of cutting and shirring arrangement limits the speed at which the final shirred, segmented product is produced, with accordingly lower volume yield. This type apparatus does have the advantage, however, of enabling the cutting device therein to sever the tubing on a substantially flat or smooth surface so that the segmented lengths which are produced can be accurately predetermined.

Other apparatuses are known which provide a cutting device subsequent to or after the shirring step occurs. For instance, U.S. Pat. No. 3,942,221 discloses an apparatus for severing thin-walled tubing after the continuous length of tubing has passed through or across a shirring mechanism. In this apparatus, in order to cleanly sever the shirred tubing, means are provided to separate a portion of the shirred tubing to produce an unfolded area thereof. However, the advance of shirred tubing is restrained with each severed segment which is produced, since the moving continuous length is constrained by appropriate means during the entire cycle of separating and severing a portion of shirred tubing. In addition, this apparatus provides for the cutting device to score the periphery of the unfolded portion, and relies upon the tension of the moving segment to tear the scored tubing to achieve severance. This tearing may result in erratic lengths of some severed segments especially if the tubing has any flaws or weak spots therein. Moreover, the cutting device of the apparatus of this patent cuts the tubing at a plurality of points around its periphery to achieve the score for severing. Such point contact, however, may be non-uniform, with some points scoring deeper than others thereby producing a possibility for uneven and erratic tearing.

Another apparatus in which a shirred tubing is cut subsequent to the shirring step is disclosed in U.S. Pat. No. 3,112,517. In this patent the shirred continuous length of tubing is separated in a portion thereof while the tubing is continuously advancing; a holding finger, which moves along the support mandrel at the speed the tubing is being shirred, holds the shirred tubing in position. Another device, notably pinch rolls, advances the moving tubing more rapidly immediately ahead of the holding finger to separate the pleats of the shirred tubing to provide an unfolded portion between the pinch rolls and the holding finger. In the unfolded portion, while the holding finger and pinch rolls are still engaged in the tubing, a cutter scores the unfolded tubing at two points and initiates tears on opposite sides of the tubing, and as the pinch rolls continue to be moved, the unfolded portion is tensioned to complete the severing operation. Although the shirred tubing is allowed to move continually in an unrestrained movement during the separating and cutting cycles, the holding finger requires a specific mechanism to allow it to cyclically engage the moving tubing, move along with the tubing at the same rate thereof and then become disengaged from the tubing after the cutting step has been performed to return to its starting position at the end of the cycle.

Thus, while methods and apparatuses are known and available to sever segments of thin-walled tubing after a shirring operation has been performed thereon, it can be seen that there is room for further improvement in an apparatus of this type, and in the method of producing segments of shirred, thin-walled tubing.

SUMMARY OF THE INVENTION

One aspect of the present invention is a method of parting a segment from an advancing length of shirred, thin-walled tubing. This method comprises unfolding a portion of the shirred tubing intermediate the ends thereof while it is advancing by applying separator means to the shirred tubing. After the portion is unfolded to separator means on the tubing is removed. The next step is the parting of the tubing in the unfolded portion thereof to produce a segment of shirred, thin-walled tubing.

The preferred method of the present invention includes unfolding the shirred tubing and then engaging the tubing in the unfolded portion thereof with a movable transfer member. The transfer member advances the tubing to the parting station so that the same may be severed at the unfolded portion thereof. In this embodiment, the parting of the tubing is performed by severing the unfolded portion of the tubing substantially circumferentially thereabout to produce the desired partition.

Another aspect of the present invention is an apparatus for parting a segment from a length of shirred, thin-walled tubing. This apparatus includes means for supporting the tubing and means for advancing the tubing along the support means. Separator means is engageable with the shirred tubing to unfold a portion thereof. Positioned in advance of the separator means and engageable with the tubing is parting means for severing the tubing in the unfolded portion thereof to produce a segment of shirred, thin-walled tubing.

One embodiment of the apparatus of the present invention includes a rotatable roll for advancing shirred tubing along a mandrel, with the separator means unfolding a portion of the tubing at a position in advance of the rotatable roll. The separator means performs its unfolding function by its movement substantially parallel to the axis of the mandrel, at a rate which is faster than the rate of the advancing shirred tubing. The parting means is positioned beyond the farthest advance of the separator means so that in order for the unfolded portion of the tubing to advance to the parting station, the separator means is removed from engagement from the tubing prior to the parting thereof. A transfer member engages the unfolded portion of the tubing and advances the same along the mandrel so that the unfolded portion thereof is brought to the position where the parting is performed. A pair of oppositely disposed jaws, each including a knife edge to produce substantially circumferential severing of the tubing, is appropriately positioned to engage the periphery of the tubing in the unfolded portion to produce the shirred segment.

The present invention is notably different from methods and apparatuses known heretofore for parting segments of shirred, thin-walled tubing, in that once the portion of the shirred tubing is unfolded and separated, the means to achieve the separated portion is removed from the tubing. Accordingly, removal of the separator means permits the tubing to continue virtually unencumbered in its advance along the mandrel even before the segment is partitioned; thus, the advancing tubing is not restrained during the complete cycle of separation and severance as has been done previously by the prior art inventions.

In accordance with the principles of the present invention, one of the resulting advantages is the higher speeds of operation to produce a plurality of segments of shirred, thin-walled tubing with concomitantly increased volume of production.

BRIEF DESCRIPTION OF THE DRAWINGS

FIG. 10 is an enlarged cross-sectional view taken along lines 10—10 of FIG. 3.

FIG. 11 is an enlarged front elevational view of the metering roll;

FIG. 12 is an enlarged elevational view of the pair of opposed parting jaws positioned prior to engagement on the tubing;

FIG. 13 is a cross-sectional view of the parting jaws taken along lines 13—13 of FIG. 12;

FIGS. 14-16 illustrate alternative separator means for performing the sequential operations of FIGS. 2-4; and FIG. 17 is an enlarged cross-sectional view taken along lines 17—17 of FIG. 15.

DETAILED DESCRIPTION

Figure 1:
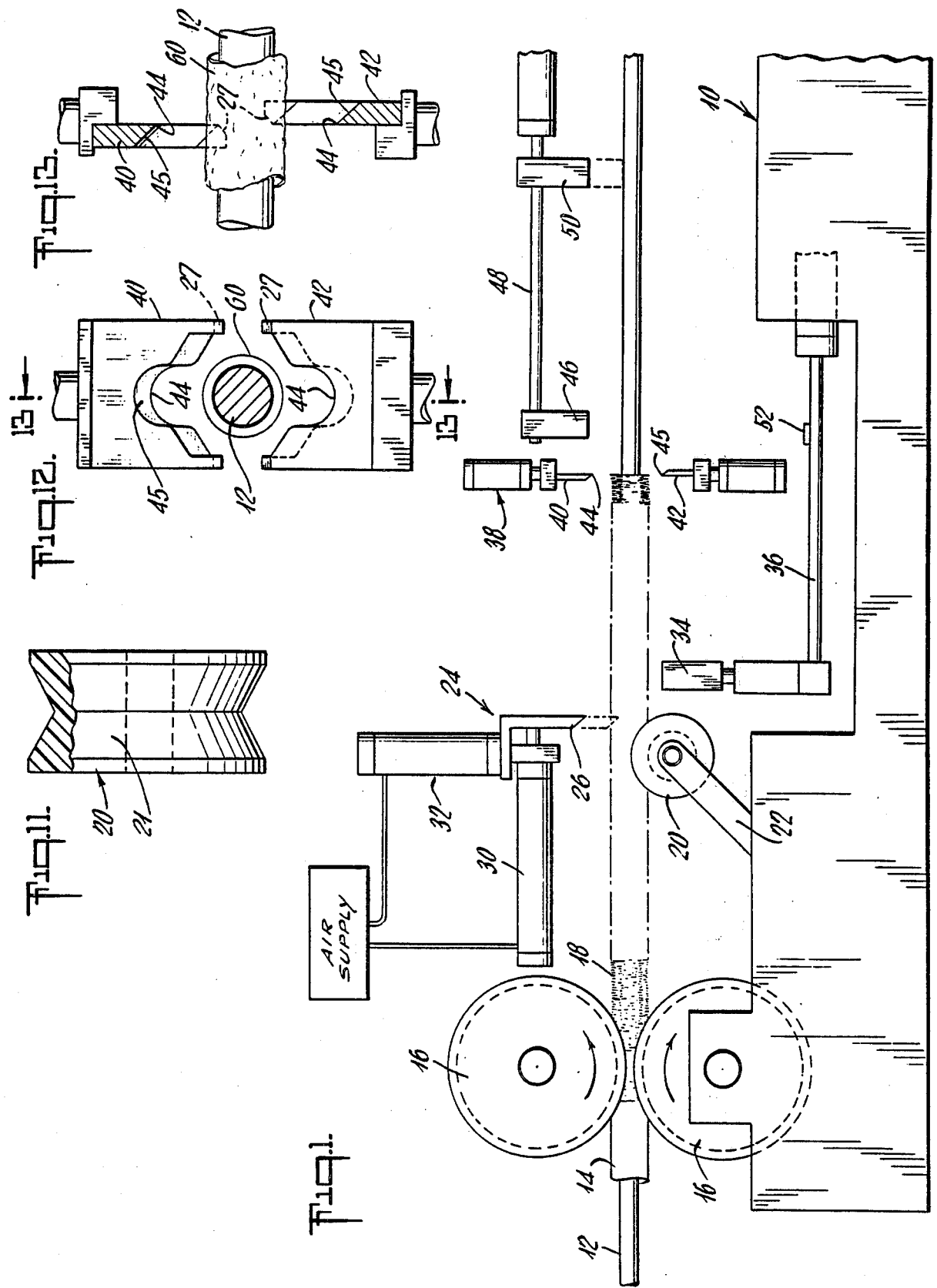
FIG. 1 is a schematic side elevational view illustrating the working elements of the preferred apparatus of the invention.

While this invention is satisfied by embodiments in many different forms there is shown in the drawings and will herein be described in detail a preferred embodiment of the invention, with the understanding that the present disclosure is to be considered as exemplary of the principles of the invention and is not intended to limit the invention to the embodiment illustrated. The scope of the invention will be pointed out in the appended claims.

Adverting to the drawings, an apparatus 10 for parting a segment or smaller length from a moving length of shirred, thin-walled tubing is illustrated. Mandrel 12 is included on the apparatus for supporting a thin-walled tubing 14 which advances along the mandrel, in this instance in a left to right direction as illustrated by the arrows. Mandrel 12 may be used for other functions in the tube making process; thus, in this apparatus only a portion of the mandrel need be available for the parting of segments of shirred tubing. Tubing 14 is formed previous to advancing to this apparatus, and is generally advanced in a continuous movement along mandrel 12 to this apparatus. The tubing, at this stage, is relatively smooth surfaced since no folding or shirring has taken place. Shirring wheels 16 engage advancing tubing 14 and fold, gather and generally accordion pleat the tubing to produce shirred tubing 18, in a continuous, moving length which is significantly compressed as compared to unshirred, smooth tubing 14. Although shirring wheels are illustrated in this embodiment to fold and shirr the tubing and to advance the same along mandrel 12, it is to be appreciated that the tubing may be shirred according to many different ways, for example using the apparatuses disclosed in U.S. Pat. Nos. 3,942,221; 3,315,300, and 3,112,517.

Shirred tubing 18 travels along mandrel 12 to metering means, generally spaced a short lateral distance from shirring wheels 16. The metering means, in this instance a rotatable roll 20, is mounted on the apparatus by a suitable bracket 22 so that its position is fixed, adjacent to mandrel 12, but adjusted so that its peripheral surface is in constant contact with shirred tubing 18, thereby advancing the shirred tubing along mandrel 12 beyond rotatable roll 20. While not shown for clarity sake, the metering rotatable roll is operated by a motor or other suitable drive means so that the rotative speed of the roll is controlled, and accordingly the rate of passage of the advancing shirred tubing across the roll is also controlled. Control of the advancing rate of shirred tubing also acts to regulate the density of the folded pleats of the shirred tubing; this allows a variability in the compressed length of shirred tubing and is helpful in producing parted shirred segments of different lengths when desired, while permitting the operational speed of the apparatus to remain high to deliver the desirable volume of shirred segments. In addition, rotatable roll 20 permits the shirred tubing to continually advance along mandrel 12 even while subsequent parting operations are being performed, so that unnecessary restraining of the advance of the tubing is eliminated.

Positioned beyond roll 20 and located vertically above mandrel 12 is separating station 24. Separating station 24 includes a grip member 26 connected by piston rods to operating air cylinders 30 and 32 which provide two-directional movement of the grip member to engage shirred tubing 18. Below the mandrel and opposite the grip member is a transfer member 34 which is mounted on the apparatus to be movable substantially parallel to the axis of mandrel 12. Appropriate tracks 36 guide transfer member 34 in its movement. While not shown, appropriate pneumatic devices are provided to control both the in and out and horizontal movement of transfer member 34.

Spaced a short distance from separating station 24 and in advance thereof is a parting station 38. Comprising parting station 38 is a pair of oppositely disposed jaws 40 and 42 astride mandrel 12. Each jaw includes a knife edge 44 for severing the tubing. As in the previous components, appropriate pneumatically operated controls direct the in and out movement of parting jaws 40 and 42 at the appropriate times in the segmenting operation. Although the jaws are illustrated in vertical alignment they may be positioned at various angles around the periphery of the tubing, including, and often desirably, horizontally aligned with respect to mandrel 12. A trip switch 52 is actuated by movement of transfer member 34 to direct parting jaws 40 and 42 into engagement on the tubing to part the segment thereof.

Further down the mandrel in the advancing direction, and located above, is a strip member 46 which is movable substantially parallel to the axis of mandrel 12 along appropriate guide means 48. Strip member 46 is controlled to move radially inwardly to contact the mandrel behind the parted segment, and move that segment along mandrel 12 to a compression station 50, following which the shirred segment is removed from the mandrel.

Figure 2:
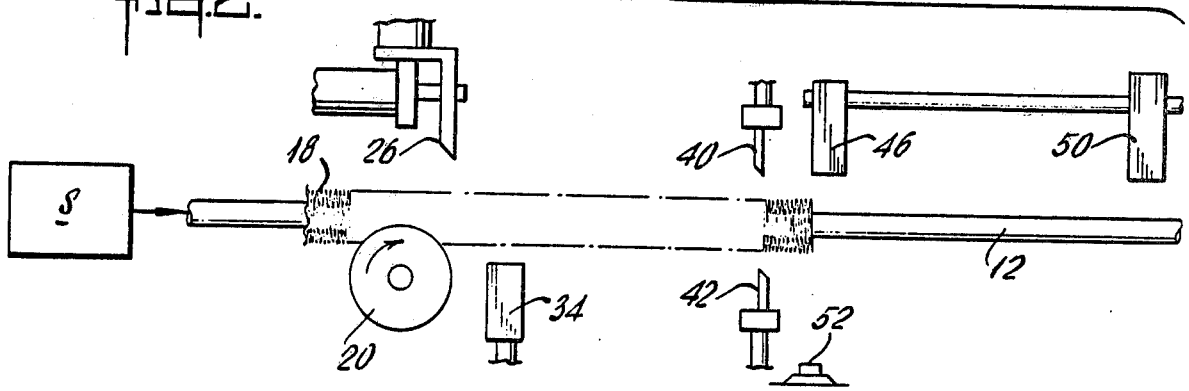
FIGS. 2-9 are enlarged partial side views illustrating the sequential operation of the apparatus of FIG. 1, each showing in particular the significant elements which cooperate to produce the segmented product.

Referring to FIGS. 2–9, the sequential operation of the preferred apparatus is illustrated. Shirred tubing 18 is provided from station S so that a continuous length of the same travels along mandrel 12. Rotatable metering roll 20 rotates in constant contact with the shirred tubing thereby controlling the rate at which the shirred tubing advances. A predetermined length, for example a 6 to 7 inch (15–18 cm.) compressed length of shirred tubing, advances beyond roll 20 as seen in FIG. 2. At this stage none of grip member 26, transfer member 34 or parting jaws 40 and 42 is in engagement with shirred tubing 18.

Figure 3:
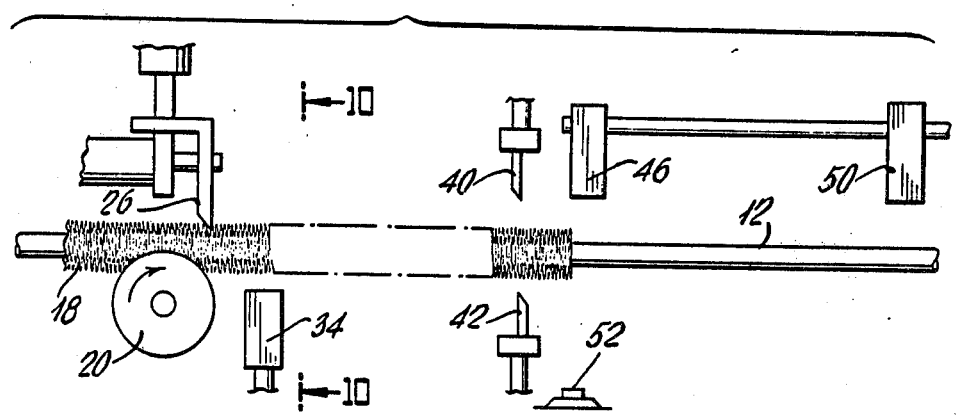
Figure 4:
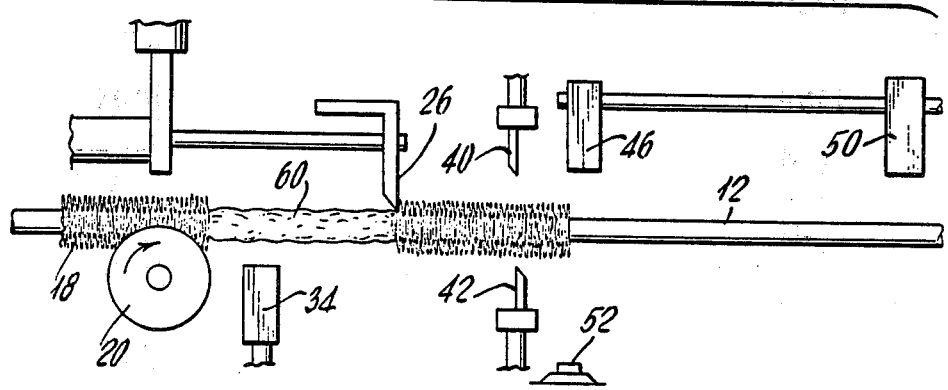

As seen in FIG. 3, after the predetermined length of shirred tubing 18 has advanced, grip member 26 is activated by a mechanism and the operable pneumatic devices so that it engages the surface of shirred tubing 18 just ahead or in advance of roll 20. The grip member is pointed so that upon engagement with the shirred tubing the point thereof provides a substantial grasp on the tubing where the engagement occurs. This engagement is seen by briefly alluding to FIG. 10. Grip member 26 has two angular edges 27 which contact shirred tubing 18 at two points in order to be able to unfold the pleats evenly and consistently. Of course, other configurations of the grip member may be employed, the one shown in FIG. 10 merely being one embodiment. The engaging movement of grip member occurs rather rapidly so that no restriction of the advancing tubing is perceived. The subsequent function of the grip member is more clearly illustrated in FIG. 4.

Once grip member 26 is in contact with tubing 18, it does not linger, but is programmed by appropriate controls to move horizontally immediately after grasping the surface of the tubing. In a movement generally much more rapid than the rate of tube advancement, engaged grip member 26 moves substantially parallel to the axis of mandrel 12 and in the direction of tube advancement to separate and unfold the folded pleats between the position where it stops and the position where it originated. It is noted that the farthest advance of grip member 26 stops short of parting jaws 40 and 42 since they are located beyond the position where the grip member terminates is separating function. Thus, the rapid advancement by grip member 26 produces an unfolded, separated portion 60 in the tubing, intermediate the ends thereof, even while the shirred tubing continues its advances along the mandrel. Typically, unfolded portion 60 is about 2–3 inches (5.1 to 7.6 cm) long. It is noted that while unfolded portion 60 is substantially deshirred or separated, no tension or stress is placed on this unfolded portion since the amount of separation is controlled by the distance which grip member 26 travels in the horizontal direction.

Figure 5:
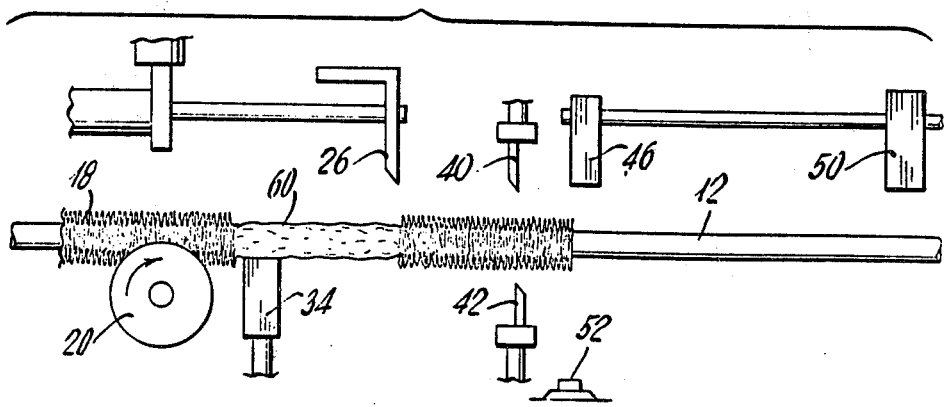

Upon producing separated, unfolded portion 60 in the shirred tubing, and after grip member 26 reaches its spaced apart position, a control, not shown, is activated whereby the grip member disengages from the tubing and returns to the starting position for the next cyclical engagement. Upon disengagement of the grip member, transfer member 34, below mandrel 12, moves radially inwardly to engage the tubing in unfolded portion 60 thereof. While it is preferable that transfer member 34 engages the tubing subsequent to disengagement of the grip member, there can be engagement by the transfer member at any time after the unfolded portion is produced, even while the grip member is still also momentarily engaged. Unfolded portion 60 of the tubing is maintained in that condition by the firm grip of transfer member 34 which generally cradles the unfolded tubing securely about mandrel 12. FIG. 5 illustrates the engagement of transfer member 34, while depicting the return cycle of the grip member.

Figure 6:
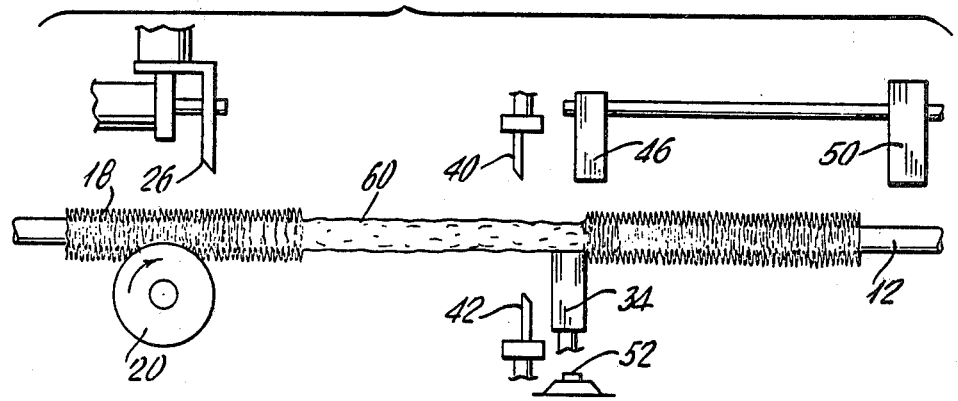

In FIG. 6, with shirred tubing 18 still advancing beyond roll 20, transfer member 34 is employed to transfer unfolded portion 60 away from the separating station to the cutting station where the segment of tubing is partitioned. It is to be appreciated that clean, efficient parting of the tubing is best performed in the portion where the tubing is unfolded. Otherwise, attempts to part or sever the shirred tubing itself would result in erratic and uncontrolled lengths of the produced segments, especially after those segments are stretched out, for example, in sausage stuffing operations. Thus, to advance the tubing so that unfolded portion 60 thereof is positioned at the parting station, transfer member 34 is controlled to advance substantially parallel to the axis of the mandrel while in engagement with the unfolded portion and to stop at a position past parting jaws 40 and 42, which at that instant remain astride mandrel 12. To maintain the unfolded portion in the tubing, the transfer member is controlled to travel at a rate at least equal to the advancing rate of the shirred tubing, but preferably at a much more rapid rate. When transfer member 34 moves at this rapid rate, additional folded pleats of the shirred tubing are separated so that unfolded portion 60 of the tubing increases somewhat. However, the unfolded portion of tubing is not excessively long since typically, the spacing between roll 20 and the parting station is in the order of a few inches.

Figure 7:
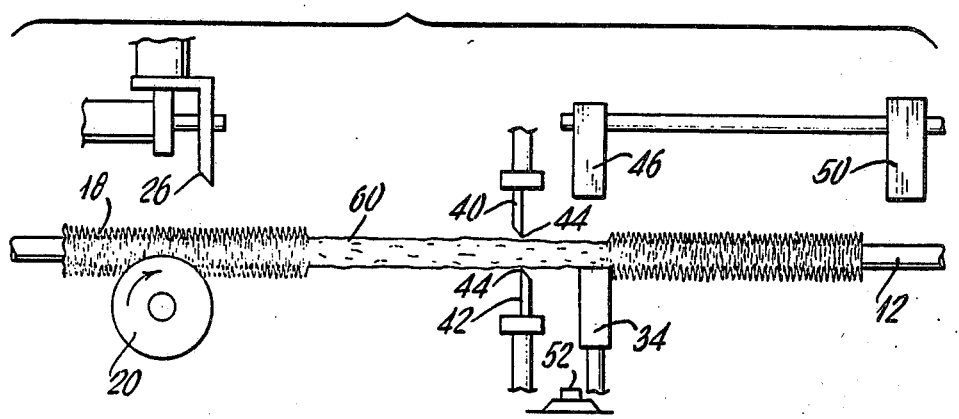
Figure 8:
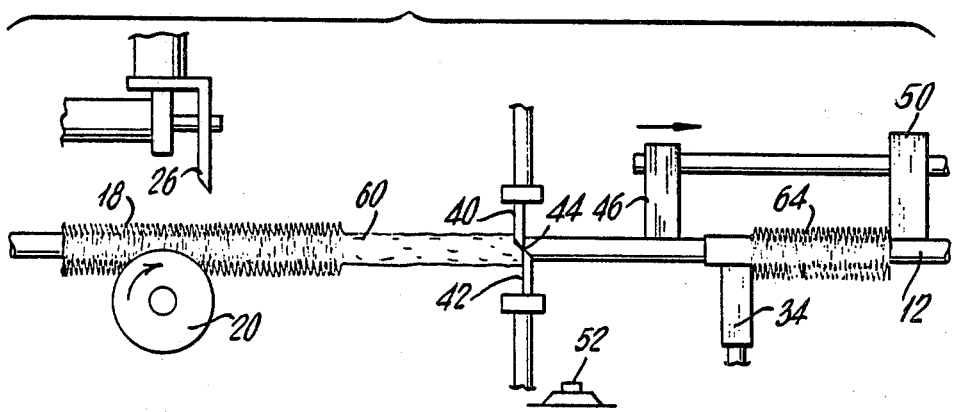

When transfer member 34 has passed the parting jaws it actuates switch 52 which controls the inwardly directed movement of parting jaws 40 and 42 toward mandrel 12. Accordingly, each of the opposed parting jaws move toward each other so that knife edge 44 on each engages unfolded portion 60 of the tubing. The action of knife edges 44 through the tubing against the support mandrel severs the tubing so that the segment beyond the cutting station can be readily detached by advancing that segment further down the mandrel. The engagement by the knife edges of the parting jaws is illustrated in FIG. 7.

Having severed or parted the tubing in unfolded portion 60 thereof, parting jaws 40 and 42 remain in position until the severed segment 64 is moved away from the continuous length of tubing. This is accomplished by the continuous movement of transfer member 34 which remains engaged on the tubing until after parting jaws 40 and 42 have become disengaged as more clearly illustrated in FIG. 8. The parting jaws have returned to their starting position to await the next length of tubing which is to be segmented. Once the parted segment 64 has been advanced along the mandrel, appropriate controls direct strip member 46 toward mandrel 12 behind the segment. Strip member 46 having arrived at its position, transfer member 34 is controlled to become disengaged from the tubing for return to its original starting position in the cycle.

Figure 9:
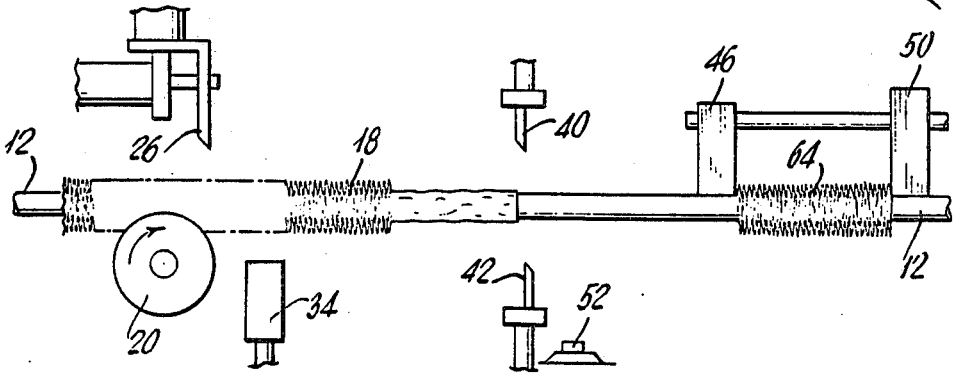

While parting jaws 40 and 42, transfer member 34 and grip member 26 all have returned to their starting positions for the next periodic engagement to sever the next segment of advancing tubing, parted segment 64 is being moved along the mandrel by the strip member as seen in FIG. 9. To compact the parted segment and reduce the tail of the unfolded portion of that segment which remains, strip member 46 advances the segment to a compression member 50. The neatly compacted segment of shirred tubing is then removed from mandrel 12 by known techniques in this art, such as that disclosed in U.S. Pat. No. 3,315,300.

It can be appreciated that the plurality of segments of shirred tubing can be produced in rapid order by the periodic engagement of the elements of this apparatus in the manner heretofore described while the shirred length of tubing is advancing along the mandrel.

In order to control the rate at which shirred tubing is advanced across the peripheral surface of metering roll 20, it has been found preferable to employ a roll which has a V-shaped configuration 21, such as illustrated in FIG. 10. V-shape 21 provides sufficient gripping of the shirred tubing material with minimal or no damage thereto, and reduces slippage of the tubing which may produce erratic lengths of the parted segments. Typically, the rotatable roll has a diameter of approximately 2 inches (5.1 cm.), and a thickness of approximately 1 inch (2.5 cm.). The internal angle formed by the V is about 90 degrees. A resilient material such as 30 durometer urethane is preferably used for the roll. This roll is controlled to rotate at a speed which will allow the shirred segments to be produced at a rate of up to 250 feet per minute (76 m./min.), or more.

Referring to FIGS. 12 and 13, the preferred parting jaws of this invention are illustrated. Parting jaws 40 and 42 are mounted on the apparatus so that each is astride mandrel 12, in an oppositely disposed relationship. Each jaw includes a substantially semi-circular knife edge 44 therein, each knife edge positioned in the jaw to semi-circularly surround and engage unfolded portion 60 of the tubing on mandrel 12 when the parting jaws have been actuated. In addition, the knife edges also extend out on an angle in two directions away from the semi-circular edge. On each end of the knife edge is a short, sharp extension 27 which is angled and positioned to mate with the extension on the opposite jaw when the jaws are brought together. When each knife edge 44 is engaged on unfolded portion 60 of the tubing, rather than merely score or cut the tubing at a number of points or perforations, a scissor-like severance is achieved due to the substantially circumferential engagement of the knife edges and their orientation with respect to each other. Each knife edge 44 is at the point of a flat surface 45 angularly oriented around the hemicircular configuration of the parting jaw. As each jaw moves towards the other around mandrel 12, sharp extensions 27 perform the first cutting of the shirred tubing in any areas in which the folds are somewhat bulky or are loosely packed. Knife edges 44, both the angled portions and semi-circular portions then cut the tubing in scissors-like fashion, and flat surfaces 45 come in face to face disposition, thus cleanly severing the tubing around the mandrel. The partition is completed by gentle pressure of knife edges 44 against mandrel 12 through the tubing. Accordingly, a clean, efficient partition of the segment of tubing is accomplished with little or no tension or tearing of the segment away from the major length of tubing.

Although the present invention is susceptible of many different embodiments, one alternative separating station is illustrated in FIGS. 14–17. These drawings show the elements of the alternative apparatus in the sequential tubing unfolding operation similar to that of FIGS. 2–4 which has been previously described. Referring specifically to FIG. 14, mandrel 70 supports shirred tubing 71 which is advancing thereon. Metering roll 72 contacts the shirred tubing and controls its rate of advance. Above the mandrel is the separating station 75. It is similar in most respects to that described above and includes a grip member 76 which is positioned to engage the shirred tubing slightly in advance of metering roll 72. Various pneumatic controls provide both inward/outward movement and lateral movement of the grip member. In addition, separating station 75 includes an indexing arm 78 which is attached to the frame structure by a pin 79 or like means so that it can pivot thereabout. At the opposite or distal end of arm 78 is a gripping finger 80 which is positioned to lie in the same plane as grip member 76.

Turning to FIG. 15, when a predetermined length of shirred tubing 71 has advanced along mandrel 70, grip member 76 and indexing arm 78 are activated in a downward direction so that both grip member 76 and gripping finger 80 engage the shirred tubing in substantially the same plane. This engagement is more clearly seen by briefly referring to FIG. 17. Grip member 76 is somewhat fork-shaped and engages the shirred tubing at two points 81 close to 180° apart and at the sides of the mandrel near its diameter. At the same time, gripping finger 80 contacts shirred tubing 71 at the top of the mandrel so that three point contact is established. This provides positive gripping for the subsequent unfolding step.

As seen in FIG. 16, grip member 76 is once again sequentially activated to advance substantially parallel to the axis of mandrel 70. This advance of grip member 76, engaged on the tubing, unfolds the folded accordion pleats of the tubing so that an unfolded portion 82 is produced. It is appreciated that the lateral movement of the grip member takes place instantaneously after it has engaged the tubing, and also moves at a much more rapid rate than the rate of the advancing tubing along the mandrel. While grip member 76 is advancing, however, indexing arm 78 remains at the same position at which gripping finger 80 engaged the tubing. In order to allow the folded pleats to unfold, arm 78 pivots on pin 79, thereby lifting finger 80 sufficiently to allow the necessary unfolding. While not shown, a spring is associated with the pivot point so that finger 80 can be maintained in light contact with the tubing. This arrangement provides control over the unfolding and produces a neater, more consistent separation in the shirred tubing once the unfolding step has been completed. As in the description of the previous embodiment, once unfolded portion 82 is produced, both grip member 76 and finger 80 are activated to become disengaged from the tubing and return to the original positions to await the next sequential operation.

Thus, the present invention provides a method and apparatus for parting a segment or smaller length from a longer length of shirred, thin-walled tubing in an operation in which the longer length of tubing is advancing, such that a plurality of shirred segments may be produced in a high-speed operation.

What is claimed is:

1. An apparatus for parting a segment from a moving length of shirred, thin-walled tubing comprising:
   a. a mandrel for supporting said tubing;
   b. means for advancing said shirred tubing along said mandrel;
   c. separator means engageable with said shirred tubing in advance of said advancing means, said separator means being movable substantially parallel to the axis of said mandrel to unfold a portion of said shirred tubing while the same is advancing;
   d. parting means positioned beyond the farthest advance of said separator means and being engageable with said tubing for parting the same in said unfolded portion thereof; and
   e. means for removing said parted segment from said mandrel, whereby a segment of shirred, thin-walled tubing is produced.

2. An apparatus as defined in claim 1 including means for disengaging said separator means from said shirred tubing after said unfolded portion has been produced, but before said parting means engages said unfolded portion for severance of said segment.

3. An apparatus as defined in claim 1 wherein said separator means comprises a grip member adapted to periodically engage said shirred tubing, said grip member being movable at a rate faster than the rate of said advancing tubing, whereby said movement of said grip member while engaged on said tubing produces a deshirred, unfolded portion thereof, said grip member being disengageable from said tubing after said unfolded portion is produced.

4. An apparatus as defined in claim 3 wherein said separator means further includes an indexing arm having a gripping finger at one end thereof, said arm adapted to pivot at its opposite end, said finger being positioned to lie substantially in the same plane as said grip member and adapted to engage said tubing substantially simultaneously with said grip member, said arm adapted to remain in position when said grip member is activated to unfold a portion of shirred tubing, but to pivot to thereby lift said finger sufficiently from said tubing to allow said unfolding step.

5. An apparatus as defined in claim 1 which further includes a movable transfer member adapted to periodically engage said unfolded portion of said tubing, said transfer member being movable substantially parallel to the axis of said mandrel to advance said tubing so that said parting means severs said tubing in the unfolded portion thereof.

6. An apparatus as defined in claim 5 which further includes actuating means responsive to movement of said transfer member for placing said parting means in engagement with said unfolded portion to sever said shirred segment from said tubing.

7. An apparatus as defined in claim 1 wherein said parting means comprises a pair of oppositely disposed jaws for engagement around the periphery of said unfolded portion of tubing, each jaw including a substantially hemi-circular knife edge so that when said jaws engage said tubing, substantially circumferential severing of said tubing is achieved by the scissors action of said knife edges through the tubing toward said support mandrel thereby producing a segmented length of shirred tubing.

8. An apparatus as defined in claim 1 wherein said means for removing said parted segment includes a strip member adapted to periodically engage said mandrel behind said parted segment to advance said segment along said mandrel for removal therefrom.

9. An apparatus as defined in claim 1 wherein said means for advancing said tubing along said mandrel is a rotatable roll adapted to contact said shirred tubing to advance the same.

10. An apparatus as defined in claim 9 wherein said roll has a V-shaped peripheral surface for contact with said tubing to advance the same along said mandrel.

11. An apparatus for parting a segment from a length of shirred, thin-walled tubing comprising:
   a. means for supporting said shirred tubing;
   b. means for advancing said shirred tubing along said support means;
   c. separator means engageable with said shirred tubing to unfold a portion thereof; and
   d. parting means positioned in advance of said separator means being engageable with said tubing for severing the same in the unfolded portion thereof to produce a segment of shirred, thin-walled tubing.

12. An apparatus for parting a segment from a moving length of shirred, thin-walled tubing comprising:
   a. a mandrel for supporting said tubing;
   b. a rotatable roll positioned adjacent said mandrel so that its peripheral surface is adapted to contact said shirred tubing for advancing the same along said mandrel;

c. a grip member being engageable with said shirred tubing in advance of said rotatable roll, said grip member being movable substantially parallel to the axis of said mandrel at a rate faster than the rate of said advancing tubing to unfold a portion of said shirred tubing while the same is advancing, said grip member being disengageable from said tubing after said unfolded portion has been produced;

d. a movable transfer member adapted to engage said unfolded portion of said tubing, said transfer member being movable substantially parallel to the axis of said mandrel to advance said tubing so that the unfolded portion thereof is advanced beyond the farthest advance of said grip member to a position where severing takes place;

e. a pair of oppositely disposed jaws for engagement around the periphery of said unfolded portion of tubing, each jaw including a substantially hemi-circular knife edge so that when said jaws engage said tubing, substantially circumferential severing of said tubing is achieved by the scissors action of said knife edges through the tubing toward said support mandrel; and f. a strip member for engagement with said mandrel behind said parted segment to advance the same along said mandrel for removal therefrom, whereby a segment of shirred, thin-walled tubing is produced.

13. A method of parting a segment from a moving length of shirred, thin-walled tubing comprising:

a. advancing a length of shirred, thin-walled tubing along a support mandrel;

b. unfolding a portion of said shirred tubing intermediate the ends thereof while the same is advancing by applying separator means to said shirred tubing;

c. removing said separator means after said unfolded portion has been produced;

d. parting said advancing tubing in the unfolded portion thereof to produce a segment of shirred, thin-walled tubing; and e. removing said segment from said mandrel.

14. A method as defined in claim 13 wherein the advancing step includes contacting said shirred tubing with a rotatable roll to advance said tubing along the mandrel.

15. A method as defined in claim 13 wherein the step of unfolding includes engaging said shirred tubing with a grip member, and moving said grip member in a direction substantially parallel to the axis of said mandrel at a rate faster than the rate of said advancing tubing, to thereby unfold a portion of said shirred tubing.

16. A method as defined in claim 15 which further includes disengaging said grip member from said tubing; engaging said tubing in said unfolded portion thereof with a movable transfer member; and advancing said transfer member substantially parallel to the axis of said mandrel so that said unfolded portion of tubing is transferred to a position at which said parting of said tubing is performed.

17. A method as defined in claim 16 wherein the advance of said transfer member actuates parting means to place the same in engagement with said unfolded portion for parting said tubing.

18. A method as defined in claim 13 wherein said parting step includes engaging said tubing in said unfolded portion thereof with a pair of oppositely disposed jaws, each including a substantially hemi-circular knife edge, and substantially circumferentially severing said unfolded portion of tubing by the action of said edges through the tubing toward said support mandrel.

19. A method as defined in claim 13 wherein said unfolding, removing and parting steps are repeated periodically and sequentially while said shirred length of tubing is advancing to produce a plurality of segments of shirred, thin-walled tubing.

20. A method of parting a segment from an advancing length of shirred, thin-walled tubing comprising:

a. unfolding a portion of said shirred tubing intermediate the ends thereof while the same is advancing by applying separator means to said shirred tubing;

b. removing said separator means after said portion is unfolded; and c. parting said tubing in said unfolded portion thereof to produce a segment of shirred, thin-walled tubing.

21. A method of parting a segment from a moving length of shirred, thin-walled tubing comprising:

a. advancing a length of shirred, thin-walled tubing along a support mandrel;

b. engaging said shirred tubing with a grip member;

c. moving said grip member in a direction substantially parallel to the axis of said mandrel at a rate faster than the rate of said advancing tubing to unfold a portion of said shirred tubing;

d. disengaging said grip member from said tubing after said unfolded portion has been produced;

e. engaging said tubing in said unfolded portion thereof with a movable transfer member;

f. advancing said transfer member substantially parallel to the axis of said mandrel so that said unfolded portion of tubing is advanced to a position where severing takes place;

g. engaging said tubing in said unfolded portion thereof with a pair of oppositely disposed jaws each including a knife edge to substantially circumferentially sever said unfolded portion of said tubing; and h. removing said parted segment of shirred, thin-walled tubing from said mandrel.

* * * * *

UNITED STATES PATENT AND TRADEMARK OFFICE
CERTIFICATE OF CORRECTION

PATENT NO. : 4,153,975
DATED : May 15, 1979
INVENTOR(S) : Francis J. Ziolko

It is certified that error appears in the above-identified patent and that said Letters Patent are hereby corrected as shown below:

Column 6, line 27, "is" should read -- its --.

Column 7, line 25, "The" should read -- This --.

Column 8, line 13, "semi-circular" should read -- hemi-circular --.

Column 8, line 15, "semi-circular" should read -- hemi-circular --.

Signed and Sealed this

Fourth Day of December 1979

[SEAL]

Attest:

SIDNEY A. DIAMOND

Attesting Officer      Commissioner of Patents and Trademarks